3,268,408
METHODS AND COMPOSITIONS EMPLOYING CINNAMOYL AMIDE

Takayuki Naito, Tokyo, Japan, assignor to Bristol-Banyu Research Institute, Ltd., Tokyo, Japan
No Drawing. Filed Mar. 3, 1964, Ser. No. 349,138
4 Claims. (Cl. 167—65)

This invention relates to a method of depressing nerve impulses at a spinal cord in animals. This invention also relates to a therapeutic composition which exhibits muscle relaxant effect upon administration.

The use of various compounds as skeletal muscle relaxants is known. A muscle relaxant acts on the spinal cord to inhibit transmission of nerve impulses through multisynaptic reflex arcs. This causes a reduction of muscle spasm with relief from pain and increased mobility of the involved muscles and results in a more rapid recovery from painful muscle spasms with shorter periods of disability.

It is an object of this invention to provide a method of depressing nerve impulses at the spinal cord. It is another object of this invention to provide a therapeutic composition which exhibits significant muscle relaxant effects.

These and other objects have been accomplished by the practice of this invention which, briefly, comprises providing a therapeutic composition which includes a pharmaceutical carrier and a muscle relaxant amount of cinnamoyl amide. This invention also involves a method of depressing nerve impulses at the spinal cord in animals, including man, which comprises administering cinnamoyl amide to said animal in an amount sufficient to produce muscle relaxation.

The compositions of this invention comprise not more than about 200 mg./kg. per dosage unit, and preferably from about 50 to about 200 mg./kg., of cinnamoyl amide together with a suitable carrier. The carrier may be either a solid or liquid and the compositions can be in the form of tablets, capsules, solutions or suspensions. The compositions can contain suitable preservatives, coloriing and flavoring agents. Some examples of the carriers which can be used in the preparation of the compositions of this invention are gelatin capsules, sugars, cellulose derivatives, such as sodium carboxy methylcellulose, gelatin, talc, magnesium stearate, vegetable oil, such as peanut oil, etc., liquid petroleum, glycerin, sorbitol, ethanol, agar and water. The carrier may serve as a binder and the composition may be tabletted. If the carrier is a gelatin capsule, the cinnamoyl amide may be encapsulated into the gelatin capsule by conventional means. If a liquid carrier is used, the composition may be in the form of a suspension or solution. The composition of this invention may be administered to animals parenterally but are preferably given orally.

The following example illustrates a method for preparing cinnamoyl amide:

Example 1

To a heated solution of cinnamic acid (104 g.; 0.7 mole) in 350 ml. of dry methylene chloride there is added thionyl chloride (172 g.; 1.45 moles). The mixture is heated under reflux until the evolution of hydrogen chloride gas has ceased. The solvent and excess thionyl chloride are removed by evaporation and the residue is distilled. The product, cinnamoyl chloride (110 g.; 95% of theoretical yield) has a boiling point of from 105–110° C. at 3 mm. of mercury.

A solution of cinnamoyl chloride (110 g.; 0.66 mole) in 30 ml. of acetone is added dropwise with stirring to 130 ml. of concentrated ammonium hydroxide solution maintained at a temperature below 5° C. After all of the cinnamoyl chloride has been added, 65 ml. of concentrated ammonium hydroxide solution are added to the mixture. The mixture is stirred for 20 minutes and the crystals which separate are collected by filtration and washed with water. The product, cinnamoyl amide, is recrystallized from alcohol and decolorized with a small amount of active carbon. The crystallized material (70 g.; 72% of theoretical yield) is determined to have a melting point of 144–146° C.

The following examples illustrate compositions and process of this invention:

Example 2

Cinnamoyl amide is encapsulated into hard gelatin capsules in an amount of 500 mg. per capsule. One or more capsules may be administered orally, depending upon the weight of the animal.

Example 3

An aqueous suspension of cinnamoyl amide is administered orally to mice in a dose of 200 mg. of cinnamoyl amide per kg. of body weight. The nerve impulses at the spinal column are thereby depressed.

Example 4

An aqueous suspension of cinnamoyl amide is administered orally to rats in daily doses of 200 mg./kg. and 400 mg./kg. for a period of one month. Significant muscle relaxant effect with no toxicity is obtained.

Upon oral administration of the compositions of this invention, significant muscle relaxant effect has been observed in animals including dogs, cats, mice and rats. In the mouse, the composition of this invention is active at 200 mg./kg. and the $LD_{50}$ of this drug in mice is 1500 mg./kg. The compositions of this invention exhibit significant muscle relaxant effects in cats at 100 mg./kg. and show some activity of 50 mg./kg. In rats, the compositions of this invention show significant muscle relaxant effect and no toxicity at doses of 200 mg./kg. and 400 mg./kg.

Although the compositions of this invention are intended primarily for oral administration, their effect upon intravenous administration has also been studied. In the spinal cat, polysynaptic reflexes were inhibited at a dose of 10 mg./kg. Upon oral administration of the composition of this invention, polysynaptic reflexes in the spinal cat were inhibited at a dose of 100 mg./kg.

I claim:

1. A therapeutic composition exhibiting muscle relaxant effect comprising a tablet or capsule containing a pharmaceutical carrier and a muscle relaxant amount of cinnamoyl amide.

2. A therapeutic composition exhibiting muscle relaxant effect comprising a tablet or capsule containing a pharmaceutical carrier and from about 50 to 200 mg./kg. of body weight per dosage unit of cinnamoyl amide.

3. A method of depressing nerve impulses at the spinal cord in a living animal which comprises orally or parenterally administering cinnamoyl amide to said animal.

4. The method of claim 3 wherein said cinnamoyl amide is administered in a dose of from 50 to 200 mg./kg. of body weight.

References Cited by the Applicant
UNITED STATES PATENTS

| | | |
|---|---|---|
| 2,734,082 | 2/1956 | Fancher. |
| 2,854,379 | 9/1958 | Fancher. |
| 3,072,648 | 1/1963 | Bonvicino. |
| 3,072,649 | 1/1963 | Semb et al. |

(Other references on following page)

FOREIGN PATENTS 906,319   9/1962   Great Britain.

OTHER REFERENCES

D. M. Gallant et al., Current Therapeutic Research (1963) 5(11), 598–9.

G. Gerbai et al., 59(6), 6403–4 (1963).

"Handbook of Chemistry and Physics," 27th Edition, Chemical Rubber Publishing Co., Cleveland, Ohio, 708–709 (1943).

JAMA, 186, 1082–1083 (December 21, 1963).

JULIAN S. LEVITT, *Primary Examiner.*

M. J. COHEN, *Assistant Examiner.*